(12) United States Patent
Hossick-Schott et al.

(10) Patent No.: US 7,081,141 B2
(45) Date of Patent: Jul. 25, 2006

(54) ELECTROLYTE FOR ELECTROLYTIC CAPACITOR

(75) Inventors: Joachim Hossick-Schott, Minneapolis, MN (US); Brian John Melody, Greer, SC (US); John Tony Kinard, Greer, SC (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 10/832,766

(22) Filed: Apr. 27, 2004

(65) Prior Publication Data

US 2004/0240151 A1    Dec. 2, 2004

Related U.S. Application Data

(62) Division of application No. 10/448,573, filed on May 30, 2003, now Pat. No. 6,788,523.

(51) Int. Cl.
*H01L 9/00*  (2006.01)
*B05D 5/12*  (2006.01)

(52) U.S. Cl. .................. 29/25.03; 427/79; 427/80
(58) Field of Classification Search .... 29/25.01–25.03; 427/79–80; 361/504, 525
See application file for complete search history.

(56) References Cited

U.S. PATENT DOCUMENTS

| | | | |
|---|---|---|---|
| 5,716,511 A | 2/1998 | Melody et al. | 205/324 |
| 5,920,455 A | 7/1999 | Shah et al. | 361/502 |
| 6,183,619 B1 | 2/2001 | Gillman et al. | 205/238 |
| 6,219,222 B1 | 4/2001 | Shaw et al. | 361/506 |

OTHER PUBLICATIONS

An Improved Series Of Electrolytes For Use In The Anodization Of Tantalum Capacitor Anodes, Melody et al., 12$^{th}$ Capacitor and Resistor Technology Symposium, Mar. 17, 1992, Proceedings pp. 40-50.

*Primary Examiner*—Ha Tran Nguyen
(74) *Attorney, Agent, or Firm*—Joseph T. Guy; Nexsen Pruet, LLC

(57) ABSTRACT

An electrolytic capacitor comprising an anode, cathode and an electrolyte. The electrolyte comprises an aqueous solution comprising a compound of formula 1:

$$CH_3-(OCH_2CH_2)_m-OCH_3 \qquad \text{Formula 1}$$

wherein m is an integer from 3 to 10. The electrolyte also comprises an ionogen.

30 Claims, No Drawings

ELECTROLYTE FOR ELECTROLYTIC CAPACITOR

REFERENCE TO RELATED APPLICATION

The present invention is a divisional application of U.S. patent application Ser. No. 10/448,573 filed May 30, 2003 now U.S. Pat. No. 6,788,523.

BACKGROUND OF THE INVENTION

The present invention relates to an electrolyte for an electrolytic capacitor and the capacitor formed therewith.

There has been an ongoing demand for ever smaller electrical components to support the continual drive to smaller devices. Of particular interest for the present invention is the demand for smaller, yet higher energy density, electrolytic capacitors. This demand has exhausted the current technical capabilities thereby requiring further advances in the art. Such an advance is provided herein.

Electrolytic capacitors, particularly tantalum-based capacitors, have been prepared utilizing aqueous solutions of ethylene glycol with ionogens such as acetic acid and phosphoric acid and ammonium acetate. Capacitors of this type are exemplified in U.S. Pat. No. 6,219,222. While these capacitors have historically fulfilled many of the necessary requirements electrolytes containing ethylene glycol are not as thermally and electrically stable as desirable.

BRIEF SUMMARY OF THE INVENTION

It is an object of the present invention to provide an electrolyte containing a more stable organic solvent than ethylene glycol.

Polyethylene glycol dimethyl ethers have greater oxidation resistance, higher boiling points and lower viscosity than ethylene glycol.

These and other advantages, as would be realised to one of ordinary skill in the art, are provided in an electrolytic capacitor comprising an anode, cathode and an electrolyte. the electrolyte comprises an aqueous solution comprising a compound of formula 1:

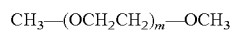
$$CH_3\text{—}(OCH_2CH_2)_m\text{—}OCH_3 \qquad \text{Formula 1}$$

wherein m is an integer from 3 to 10. The electrolyte also comprises an ionogen.

Another embodiment is provided in an electrolyte for activating a capacitor. The electrolyte comprises water and about 10 to about 70%, by weight, a compound of formula 1:

$$CH_3\text{—}(OCH_2CH_2)_m\text{—}OCH_3 \qquad \text{Formula 1}$$

wherein m is an integer from 3 to 10. The electrolyte further comprises an ionogen and an acid.

Another embodiment is provided in an electrolytic capacitor. The capacitor comprises an anode of a valve metal and a metal oxide cathode. The capacitor further comprises an aqueous electrolyte comprising a compound of formula 1:

$$CH_3\text{—}(OCH_2CH_2)_m\text{—}OCH_3 \qquad \text{Formula 1}$$

wherein m is an integer from 3 to 10. The electrolyte further comprises about 0.05 to about 40%, by weight, ionogen and the electrolyte has a pH of about 1 to about 7.

A particularly preferred embodiment is provided in a method for providing a capacitor. The method comprises the steps of:
a) providing a tantalum anode;
b) providing a cathode;
c) activating the anode and the cathode with an electrolyte wherein the electrolyte comprises water; about 10 to about 70%, by weight, at least one compound of formula 1:

$$CH_3\text{—}(OCH_2CH_2)_m\text{—}OCH_3 \qquad \text{Formula 1}$$

wherein m is an integer from 3 to 10; about 0.05 to about 40%, by weight, ionogen; and optionally an acid.

DETAILED DESCRIPTION OF THE INVENTION

The inventors have developed through diligent research an electrolyte, particularly suitable for use in electrolytic capacitors, comprising polyethylene glycol dimethyl ethers as a component of an aqueous electrolyte system.

Electrolytic capacitors, particularly tantalum electrolytic capacitors, fabricated so as to manifest a large energy density (i.e., high energy per unit volume) at intermediate use voltages (i.e., from about 150 volts to about 300 volts) are generally fabricated from powder metallurgy compacts. The compacts are sintered at appropriately high temperature and are then anodized in an anodizing electrolyte prior to assembly into finished capacitors. During the assembly operation each anode compact is impregnated with a working or fill electrolyte which serves to conduct current from the cathode surface of the device to the anode oxide dielectric. Once the anode body is impregnated with a working electrolyte, the device is sealed so as to prevent escape of the liquid electrolyte. The device is typically tested prior to being placed into service. The working electrolyte usually is characterized as having a much lower resistance and dissipation factor than anodizing electrolytes. One undesirable consequence of the relatively low electrical resistivity of the working electrolyte is that the breakdown voltage of the electrolyte, that is the maximum voltage which the electrolyte will support regardless of the voltage to which the anode is anodized, is generally significantly lower than that of appropriate anodizing electrolytes. Working electrolytes have to be chosen so as to have a sufficiently high breakdown voltage so as not to cause premature failure during the working life of the device.

The aqueous anodizing solution of the present invention comprises about 0.05 to about 40%, by weight, ionogen; about 10 to about 70%, by weight, at least one compound referred to in the art as polyethylene glycol dimethyl ethers and specifically defined by Formula 1:

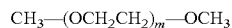
$$CH_3\text{—}(OCH_2CH_2)_m\text{—}OCH_3 \qquad \text{Formula 1}$$

wherein m is an integer from 3 to 10;

and optionally an additional acid sufficient to maintain an acidic pH.

More preferably the aqueous electrolyte comprises about 25–50 wt % of the compound of Formula 1. In the compound of Formula 1, m is most preferably an integer of 4. When m is less than about 3 the compound is unstable and when m is above about 10 the solubility of the compound is undesirable.

More preferably the ionogen represents about 5 to about 30%, by weight, of the electrolyte solution. The ionogen is preferably an ammonium compound or an acid. Suitable ionogens include ammonium acetate, ammonium hydrogen maleate, ammonium hydrogen phosphate, ammonium phosphate, ammonium di-hydrogen phosphate, orthophosphoric acid, citric acid, maleic acid, malonic acid, adipic acid and succinic acid. Particularly preferred ionogens include ammonium acetate, acetic acid and orthophosphoric acid.

The anode is a valve metal preferably chosen from titanium, tungsten, chromium, aluminium, zirconium, hafnium, zinc, vanadium, niobium, tantalum, bismuth, antimony and mixtures and alloys thereof. Tantalum is the most preferred anode.

The cathode is a conductive metal provided with a semiconductive or metal-like conductive coating. The coating can be carbon or an oxide, nitride, or carbide of a metal. Suitable cathode metals include tantalum, titanium, nickel, iridium, platinum, palladium, gold, silver, cobalt, molybdenum, ruthenium, manganese, tungsten, iron, zirconium, hafnium, rhodium, vanadium, osmium and niobium. A particularly preferred cathode electrode comprises a porous ruthenium oxide film provided on a titanium substrate.

It is preferable that the electrolyte be maintained at an acidic pH. Most preferably the electrolyte is maintained at a pH of about 1 to about 7. More preferred is a pH of about 3 to about 6. A pH of about 4 to 5 is most preferred.

The pH is adjusted, if necessary, by incorporation of an acid. Suitable acids include orthophosphoric acid, citric acid, maleic acid, malonic acid, malic acid, adipic acid and succinic acid. Orthophosphoric acid is the preferred acid and it is preferred that orthophosphoric acid be included in the electrolyte due to the chemical stability of the oxide afforded thereby.

An optional, but preferred, separator material physically separates the anode and cathode from each other. The separator prevents electrical short circuits between the anode and cathode. The separator material is preferably unreactive with the anode, cathode and electrolyte and is sufficiently porous to allow the electrolyte to freely flow through the separator. Suitable separators include woven and non-woven fabrics of polyolefinic fibers known in the art. Various modifications to improve the wettability of the separator are well known in the art and within the scope of ordinary skill in the art.

The invention has been described with particular emphasis on the preferred embodiments. It would be realized from the teachings herein that other embodiments, alterations and configurations could be employed without departing from the scope of the invention which is more specifically set forth in the claims which are appended hereto.

The invention claimed is:

1. A method for providing a capacitor comprising the steps of:
   providing a tantalum anode;
   providing a cathode;
   activating said anode and said cathode with an electrolyte comprising:
      water;
      about 10 to about 70%, by weight, at least one compound of formula 1:

   Formula 1 wherein m is an integer from 3 to 10;
      about 0.05 to about 40%, by weight, ionogen; and
      an acid.

2. A method according to claim 1 wherein said m is an integer from 3 to 5.

3. A method according to claim 2 wherein said m is 4.

4. A method according to claim 1 wherein said ionogen is at least one material selected from the group consisting of ammonium acetate, ammonium hydrogen maleate, ammonium hydrogen phosphate, orthophosphoric acid, citric acid, maleic acid, malonic acid, adipic acid and succinic acid.

5. A method according to claim 4 wherein said ionogen is at least one element selected from the group consisting of ammonium acetate and acetic acid.

6. A method according to claim 1 wherein said acid is at least one acid selected from a group consisting of orthophosphoric acid, citric acid, maleic acid, malonic acid, malic acid, adipic acid and succinic acid.

7. A method according to claim 6 wherein said acid is orthophosphoric acid.

8. A method according to claim 1 comprising about 0.05 to about 50%, by weight, said compound.

9. A method according to claim 1 comprising about 5 to about 30%, by weight, said ionogen.

10. A method according to claim 1 wherein said cathode is a conductive metal provided with a semiconductive or metal-like conductive coating.

11. A method according to claim 10 wherein said cathode is at least one element chosen from a group consisting of carbon or an oxide, nitride, or carbide of a metal.

12. A method according to claim 11 wherein said cathode comprises a metal selected from a group consisting of tantalum, titanium, nickel, iridium, platinum, palladium, gold, silver, cobalt, molybdenum, ruthenium, manganese, tungsten, iron, zirconium, hafnium, rhodium, vanadium, osmium and niobium.

13. A method according to claim 10 wherein said cathode comprises a porous ruthenium oxide film provided on a titanium substrate.

14. A method according to claim 1 wherein said aqueous solution has a pH of about 1 to about 7.

15. A method according to claim 14 wherein said aqueous solution has a pH of about 4.

16. A method for providing a capacitor comprising the steps of:
   providing a tantalum anode;
   anodizing said tantalum anode in an anodizing electrolyte;
   providing a cathode;
   activating said anode and said cathode with a working electrolyte comprising:
      water;
      about 10 to about 70%, by weight, at least one compound of formula 1:

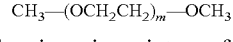   Formula 1 wherein m is an integer from 3 to 10;
      about 0.05 to about 40%, by weight, ionogen; and
      an acid.

17. The method according to claim 16 wherein said m is an integer from 3 to 5.

18. The method according to claim 17 wherein said m is 4.

19. The method according to claim 16 wherein said ionogen is at least one material selected from the group consisting of ammonium acetate, ammonium hydrogen maleate, ammonium hydrogen phosphate, orthophosphoric acid, citric acid, maleic acid, malonic acid, adipic acid and succinic acid.

20. A method according to claim 19 wherein said ionogen is at least one element selected from the group consisting of ammonium acetate and acetic acid.

21. The method according to claim 16 wherein said acid is at least one acid selected from a group consisting of orthophosphoric acid, citric acid, maleic acid, malonic acid, malic acid, adipic acid and succinic acid.

22. The method according to claim 21 wherein said acid is orthophosphoric acid.

23. The method according to claim 16 comprising about 0.05 to about 50%, by weight, said compound.

24. The method according to claim 16 comprising about 5 to about 30%, by weight, said ionogen.

25. The method according to claim 16 wherein said cathode is a conductive metal provided with a semiconductive or metal-like conductive coating.

26. The method according to claim 25 wherein said cathode is at least one element chosen from a group consisting of carbon or an oxide, nitride, or carbide of a metal.

27. The method according to claim 26 wherein said cathode comprises a metal selected from a group consisting of tantalum, titanium, nickel, iridium, platinum, palladium, gold, silver, cobalt, molybdenum, ruthenium, manganese, tungsten, iron, zirconium, hafnium, rhodium, vanadium, osmium and niobium.

28. The method according to claim 25 wherein said cathode comprises a porous ruthenium oxide film provided on a titanium substrate.

29. The method according to claim 16 wherein said aqueous solution has a pH of about 1 to about 7.

30. The method according to claim 29 wherein said aqueous solution has a pH of about 4.

* * * * *

UNITED STATES PATENT AND TRADEMARK OFFICE
CERTIFICATE OF CORRECTION

PATENT NO.        : 7,081,141 B2
APPLICATION NO.   : 10/832766
DATED             : July 25, 2006
INVENTOR(S)       : Joachim Hossick-Schott, Brian John Melody and John Tony Kinard It is certified that error appears in the above-identified patent and that said Letters Patent is hereby corrected as shown below:

TITLE PAGE, ITEM (73) ASSIGNEE:
SHOULD READ:
Assignee:   Medtronic, Inc. (Minneapolis, MN)
            Kemet Electronics Corporation (Greenville, SC)

Signed and Sealed this

Nineteenth Day of February, 2008

JON W. DUDAS
*Director of the United States Patent and Trademark Office*